United States Patent
Sezer et al.

(10) Patent No.: US 8,923,388 B2
(45) Date of Patent: Dec. 30, 2014

(54) EARLY STAGE SLICE CAP DECISION IN VIDEO CODING

(75) Inventors: Osman Gokhan Sezer, Plano, TX (US); Mehmet Umut Demircin, Kecioren (TR); Minhua Zhou, Plano, TX (US); Pramod Kumar Swami, Bangalore (IN); Uday Kiran Pudipeddi, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 540 days.

(21) Appl. No.: 13/301,774

(22) Filed: Nov. 21, 2011

(65) Prior Publication Data

US 2013/0128949 A1 May 23, 2013

(51) Int. Cl.
*H04N 7/32* (2006.01)
*H04N 7/64* (2006.01)
*H04N 7/26* (2006.01)
*H04N 19/119* (2014.01)
*H04N 19/174* (2014.01)
*H04N 19/149* (2014.01)

(52) U.S. Cl.
CPC ... *H04N 19/00072* (2013.01); *H04N 19/00272* (2013.01); *H04N 19/00181* (2013.01)
USPC ............ 375/240.02; 375/240.05; 375/240.12; 375/240.24

(58) Field of Classification Search
CPC .................. H04N 19/00072; H04N 19/00181; H04N 19/00272
See application file for complete search history.

(56) References Cited

U.S. PATENT DOCUMENTS

| | | | | |
|---|---|---|---|---|
| 2006/0126728 A1* | 6/2006 | Yu et al. | ................... | 375/240.03 |
| 2007/0242748 A1* | 10/2007 | Mahadevan et al. | ...... | 375/240.14 |
| 2009/0022228 A1* | 1/2009 | Wang et al. | .............. | 375/240.24 |
| 2009/0135918 A1* | 5/2009 | Mak-Fan et al. | ......... | 375/240.28 |
| 2010/0086032 A1* | 4/2010 | Chen et al. | ................ | 375/240.12 |
| 2011/0013693 A1* | 1/2011 | Shimizu et al. | ........... | 375/240.05 |
| 2011/0032983 A1 | 2/2011 | Sezer | | |
| 2011/0103473 A1* | 5/2011 | Li et al. | ..................... | 375/240.12 |

OTHER PUBLICATIONS

Zhihai He and Sanjit K. Mitra, "Optimum Bit Allocation and Accurate Rate Control for Video Coding via ρ-Domain Source Modeling", IEEE Transactions on Circuits and Systems for Video Technology, vol. 12, No. 10, Oct. 2002, pp. 840-849.

"Extended Video Procedures and Control Signals for H.300-Series Terminals", ITU-T Recommendation H.241, Series H: Audiovisual and Multimedia Systems, Infrastructure of Audiovisual Services—Communication Procedures, ITU-T Telecommunication Standardization Sector of ITU, May 2006, pp. 1-40.

Thomas Wiegand et al, "Overview of the H.264/AVC Video Coding Standard", IEEE Transactions on Circuits and Systems for Video Technology, vol. 13, No. 7, Jul. 2003, pp. 560-576.

* cited by examiner

*Primary Examiner* — Dave Czekaj
*Assistant Examiner* — Md Haque
(74) *Attorney, Agent, or Firm* — Mirna Abyad; W. James Brady; Frederick J. Telecky, Jr.

(57) ABSTRACT

A method for making a slice cap decision during encoding of a video sequence in a video encoding pipe is provided that includes determining a prediction mode for a macroblock, computing an estimated encoded size of the macroblock based on an adaptive macroblock size estimation model, and making a slice cap decision for a current slice based on the estimated encoded macroblock size, wherein the slice cap decision is made prior to entropy coding the macroblock.

19 Claims, 5 Drawing Sheets

EARLY STAGE SLICE CAP DECISION IN VIDEO CODING

BACKGROUND OF THE INVENTION

1. Field of the Invention

Embodiments of the present invention generally relate to making a decision to cap the size of a slice in an early stage of video encoding.

2. Description of the Related Art

H.264/MPEG-4 AVC, referred to as H.264 herein, is a block-oriented motion-compensation-based codec standard developed by the International Telecommunication Union (ITU) Telecommunication Standardization Sector (ITU-T) Video Coding Experts Group (VCEG) together with the ISO/IEC Moving Picture Experts Group (MPEG). The ITU-T H.264 standard and the ISO/IEC MPEG-4 AVC standard (formally, ISO/IEC 14496-10-MPEG-4 Part 10, Advanced Video Coding) are jointly maintained so that they have identical technical content. H.264 specifies both a Network Abstraction Layer (NAL) and a Video Coding Layer (VCL). In general, the VCL encodes the video signal, and the NAL formats the output of the VCL into NAL units that contain an integer number of bytes for conveyance by a variety of transport layers or storage media. For example, the NAL may map VCL data to transport layers such as RTP/IP for real-time wire-line and wireless internet services or ITU-T H.300 series terminals for wire-lien and wireless conversational services.

The ITU-T Recommendation H.241, entitled "Extended Video Procedures and Control Signals for H.300 Series Terminals", establishes the communication procedures for the use of advanced video codecs, including H.264, with H.300 series terminals such as the communication terminals of ITU-T Recs. H.310, H.320, H.321, H.322, H.323 and H.324. These communication procedures include control, indication, capability exchange and transport mechanisms. H.241 also specifies that the maximum size of NAL units generated by a video codec is constrained by the size of the maximum transmission unit (MTU) of an IP-network. That is, to avoid IP-layer packet fragmentation, H.241 states that NAL units should be substantially shorter than the MTU size of the network. For example, on an Ethernet network with a 1472 byte MTU, H.241 recommends a maximum size of 1200 bytes for a NAL Unit to allow for addition of a header without exceeding the MTU size of the network.

To reduce error due to packet losses in video streaming over an IP-network, the NAL units may be generated such that each NAL unit contains an independently decodable piece of video data, i.e., a slice of a picture in a video stream. That is, in H.264, a picture may be segmented into sequences of macroblocks referred to as slices that are separately encoded. As used herein, the term "picture" refers to a frame or a field of a frame and the term "frame" refers to a complete image captured during a known time interval. A single slice may be encapsulated in a single NAL unit. It is the responsibility of the video encoder to ensure that the sizes of the slices in the output bit stream comply with the maximum allowed NAL unit size.

SUMMARY

Embodiments of the present invention relate to making a slice cap decision during encoding of a video sequence in a video pipeline. In one aspect, a method is provided that includes determining a prediction mode for a macroblock, computing an estimated encoded size of the macroblock based on an adaptive macroblock size estimation model, and making a slice cap decision for a current slice based on the estimated encoded macroblock size, wherein the slice cap decision is made prior to entropy coding the macroblock. In some embodiments, the adaptive macroblock size estimation model may be based on a rate distortion cost of the macroblock, a quantization step size determined for the macroblock, and size estimation parameters representative of accuracy of encoded size estimations for a plurality of previously encoded macroblocks. In some embodiments, the adaptive macroblock size estimation model may be based on a measure of rate distortion of the macroblock, a proportional factor $\rho$ representing accuracy of macroblock size estimations in a previously encoded frame, and an offset factor $\epsilon$ representing accuracy of size estimation for neighboring macroblocks of the macroblock.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
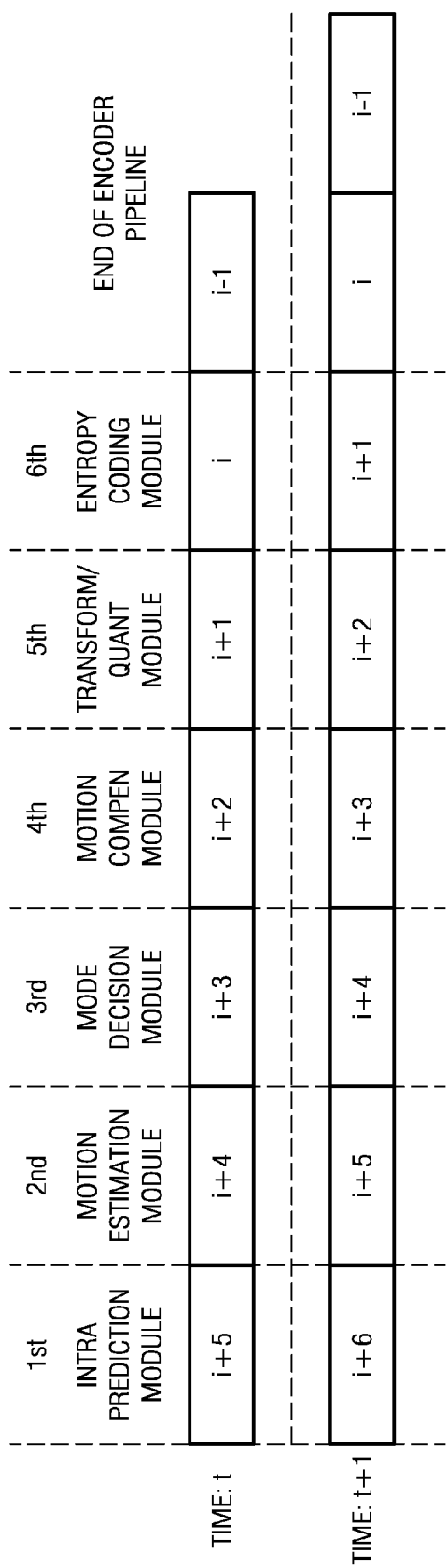
FIG. 1 is an example of a video encoding pipeline.

Specific embodiments of the invention will now be described in detail with reference to the accompanying figures. Like elements in the various figures are denoted by like reference numerals for consistency.

As was previously mentioned, to reduce error in video streaming over an IP-network due to packet losses, an H.264 video encoder may generate NAL units that contain independently decodable slices of coded video data. That is, there will be a one-to-one correspondence between a slice and a NAL unit. Further, it is the responsibility of the video encoder to cap the size of each slice to comply with a maximum allowed NAL unit size. The decision to end a slice and begin a new one is typically done after entropy coding when the number of bits consumed to encode a macroblock is known.

The slice cap decision problem is challenging for real-time video coding applications implemented on embedded systems in which macroblocks are encoded concurrently in a pipeline fashion. More specifically, an embedded system may include a master processor and processing modules, i.e., hardware accelerators, specifically designed to support the computation intensive tasks of video encoding such as intra-prediction, motion estimation, mode decision, motion compensation, transformation/quantization, and entropy coding. In such a system, a video encoding control loop on the master processor moves macroblocks to be encoded through the encoding modules such that the modules operate in parallel on multiple macroblocks while data movement from one module to another is serial. That is, the encoding modules are controlled in a pipeline fashion by the master processor such that the encoding modules operate on different macroblocks of a picture at any given time.

FIG. 1 shows an example of such pipeline processing in a video encoder. FIG. 1 is intended to demonstrate the general idea of one ordering of processing modules and how macroblocks are shifted from one module to another in time. Other video encoding pipelines may include more or fewer processing modules and/or some of the processing stages may be ordered differently. For example, a direct memory access (DMA) pipeline stage may be included between some or all of the processing modules to facilitate the movement of data between the modules. As shown in FIG. 1, the video encoding pipeline includes six modules, an intra prediction module, a motion estimation module, a mode decision module, a motion compensation module, a transformation/quantization module, and an entropy coding module.

Each of these modules processes at least one macroblock at time t and waits for the previous module to complete processing of the subsequent macroblock(s) before working on that one at time t+1. For example, the macroblock indicated by (i+2) is in the fourth module, i.e., the motion compensation module, at time t and moves to fifth module, i.e., the transformation/quantization module, at time t+1. The serial data shifts and parallel execution of the processing modules enables a fast encoding architecture for real-time video encoding.

With a pipelined architecture, a decision to cap a slice made after entropy coding in the pipeline may affect the encoding parameters in previous stages which may require re-processing of at least some of the macroblocks in the pipeline, i.e., rewinding the pipeline to a previous stage. In the worst case, the encoder pipeline would need to be flushed and restarted, resulting in wasted hardware cycles and increased processing overhead. More specifically, as was previously mentioned, a slice is independently decodable, i.e., decoding of a slice should not depend on any data not in the slice. In a pipelined video encoder, starting a new slice after entropy coding may make the processing already done in at least some of the pipeline stages for subsequent macroblocks unusable because the subsequent macroblocks have been processed under the assumption that they will be in the same slice. For example, intra prediction may introduce data dependencies as the macroblocks are intra-predicted based on other macroblocks in the same frame. Thus, if the decision to start a new slice is made after entropy coding, at least some of the processing of the subsequent macroblocks may need to be repeated, adding to the overhead of starting a new slice.

Moreover, the increased overhead of starting a new slice due to pipeline rewinding increases picture encoding time. Such increases in encoding time may result in the video encoder not being able to achieve real-time encoding, i.e., the encoder may take more time to encode a picture than the time between capture of two successive pictures. Thus, the encoder may start dropping pictures in order to meet the real-time coding requirement, thus reducing the quality of the encoded video.

Therefore, to reduce the pipeline overhead incurred to start a new slice, it would be better to make the decision to start a new slice at an earlier stage in the pipeline, such as before or during the mode decision. A decision as to whether or not a new slice is to be started with a macroblock that is at the prediction mode decision stage would ensure that the selected prediction mode (e.g., intra mode) for that macroblock is valid. Note that the prediction mode would become invalid if the decision to start a new slice with the macroblock was made after entropy coding the macroblock as the intra prediction of that macroblock may have been dependent on data that is in the previous slice.

Embodiments of the invention provide for making a slice cap decision at an earlier stage in the pipeline than entropy coding. More specifically, some embodiments of the invention provide for making a slice cap decision at the prediction mode decision stage in the pipeline. In general, after a prediction mode is determined for a macroblock, the encoded size of the macroblock is estimated based on an adaptive macroblock size estimation model. The macroblock size estimation model is adaptive in that one or more parameters of the estimation model are updated based on the actual encoded sizes of previously encoded macroblocks. The estimated macroblock size is then used to make a slice cap decision, i.e., to determine whether the macroblock is to be added to the current slice or a new slice is to be started with the macroblock as the first macroblock in the new slice. This decision is made before the macroblocks in the pipeline are moved to their respective next stages.

In some embodiments, the macroblock size estimation model uses a measure of the rate distortion of the macroblock, a proportional factor representing the accuracy of the macroblock size estimations in the previously encoded frame, and an offset factor representing the accuracy of the size estimations for neighboring macroblocks to estimate the size of a macroblock. The proportional factor is adapted at the frame level and the offset factor is adapted for each macroblock. In other words, in such embodiments, the macroblock size estimation model exploits both the temporal and spatial correlation of macroblocks in estimating the encoded size of a macroblock. The estimated macroblock size is then used to update an estimate of the slice size. The estimated slice size includes the actual encoded sizes of previously encoded macroblocks in the slice and the estimated encoded sizes of the macroblocks in the pipeline. The estimated slice size is then compared to a slice size threshold to make the slice cap decision.

In some embodiments, the macroblock size estimation model uses the rate distortion cost determined for the macroblock in making the prediction mode decision, the quantization step size determined for the macroblock by rate control, and two size estimation parameters representative of the accuracy of the encoded size estimations for some number of previously encoded macroblocks to estimate the encoded size of a macroblock. Adaptation of the size estimation parameters is explained in more detail herein. The estimated macroblock size is then used to update an estimate of the encoded size of the macroblocks in the pipeline. The sum of the estimated encoded size of the pipeline macroblocks and the current slice size is the estimated slice size. In addition, an adaptive estimation error threshold is updated based on estimation error, i.e., the difference between the actual and estimated encoded sizes of macroblocks, for some number of previously encoded macroblocks. The difference between the maximum slice size and the estimated slice size is compared to the estimation error threshold to make the slice cap decision.

Figure 2:
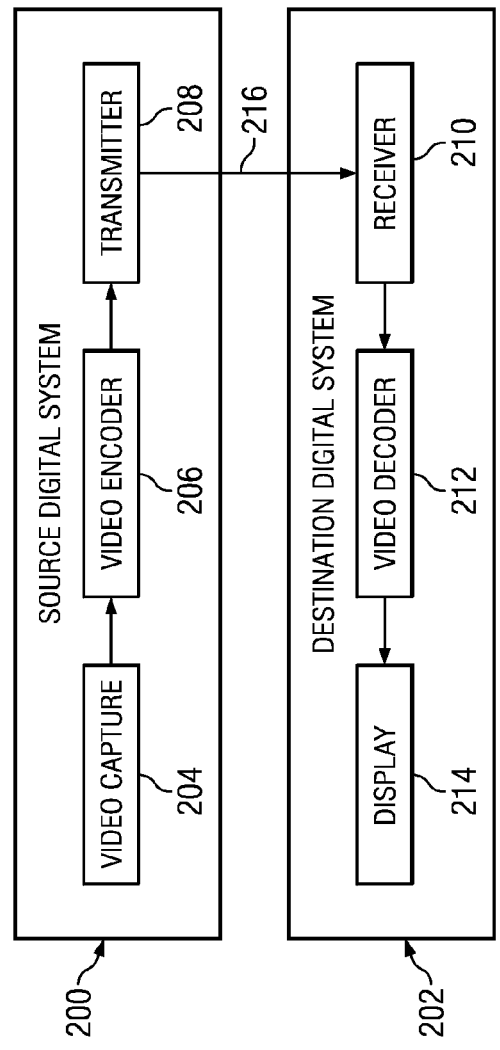
FIG. 2 is a block diagram of a digital system.

FIG. 2 shows a block diagram of a digital system in accordance with one or more embodiments. The system includes a source digital system 200 that transmits encoded video sequences to a destination digital system 202 via a communication channel 216. The source digital system 200 includes a video capture component 204, a video encoder component 206 and a transmitter component 208. The video capture component 204 is configured to provide a video sequence to be encoded by the video encoder component 206. The video capture component 204 may be for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into macroblocks, and encodes the video data in the macroblocks in a pipeline, e.g., the encoding pipeline of FIG. 1. The video encoder component 206 may be configured to make a slice cap decision at the prediction mode determination stage during the encoding process as described herein. Embodiments of the video encoder component 206 are described in more detail below in reference to FIGS. 3A and 3B.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the macroblocks of the video sequence. The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video streaming, video broadcasting, video conferencing, gaming, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware; such as, for example, one or more digital signal processors (DSPs), microprocessors, discrete logic, application specific integrated circuits (ASICs), field-programmable gate arrays (FPGAs), etc.

Figure 3A:
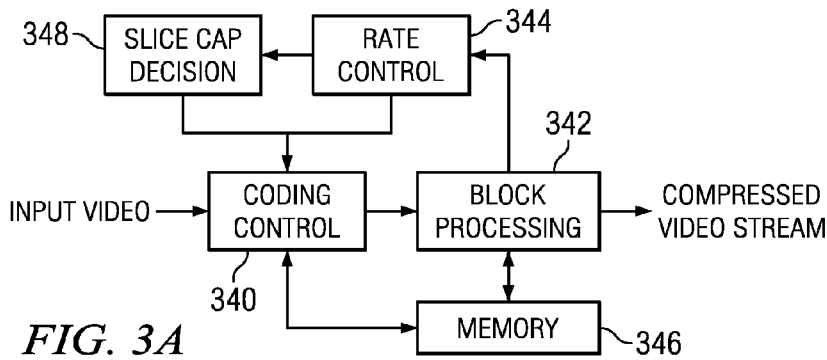
FIGS. 3A and 3B are block diagrams of a video encoder.
Figure 3B:
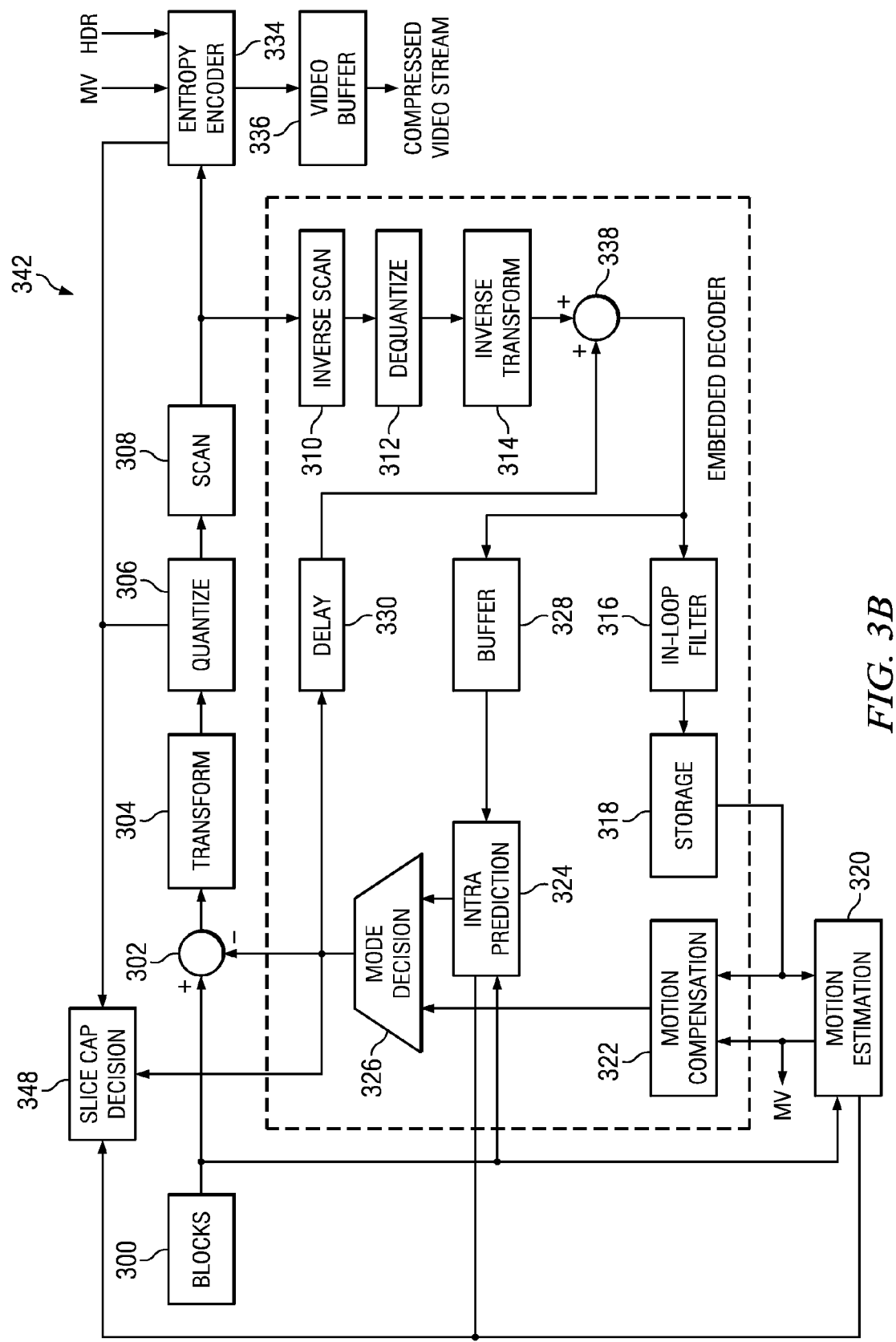

FIGS. 3A and 3B show block diagrams of a video encoder, e.g., the video encoder 206 of FIG. 2, configured to make a slice cap decision at the prediction mode determination stage. FIG. 3A shows a high level block diagram of the video encoder and FIG. 3B shows a block diagram of the block processing component 342 of the video encoder.

As shown in FIG. 3A, a video encoder includes a coding control component 340, a block processing component 342, a rate control component 344, a slice cap decision component 348, and a memory 346. The memory 346 may be internal memory, external memory, or a combination thereof. The memory 346 may be used, for example, to store information for communication between the various components of the video encoder.

The rate control component 344 determines a quantization scale QS for each macroblock in a picture based on various rate control criteria and provides the QS to the coding control component 340 and to the slice cap decision component 348. The rate control component 344 may use any suitable rate control algorithm that determines QS values based on a budget of bits allocated to a picture.

The slice cap decision component 348 determines whether or not a new slice is to be started each time a prediction mode is determined for a macroblock. More specifically, when a prediction mode is determined for a macroblock, the slice cap decision component 348 performs a slice cap decision method as described herein in reference to FIGS. 4 and 5. When the slice cap decision component 348 determines that a new slice is to be started, the slice cap decision component 348 indicates to the coding control component 340 that a new slice is to be started with the macroblock that just completed the prediction mode decision stage.

An input digital video sequence is provided to the coding control component 340. The coding control component 340 sequences the various operations of the video encoder, i.e., the coding control component 340 runs the main control loop for video encoding. For example, the coding control component 340 performs any processing on the input video sequence that is to be done at the picture level, such as determining the coding type (I, P, or B), i.e., prediction mode, of each picture based on the coding structure, e.g., IPPP, IBBP, hierarchical-B, being used. The coding control component 340 also divides each picture into macroblocks for further processing by the block processing component 342. In addition, the coding control component 340 controls the processing of the macroblocks by the block processing component 342 in a pipeline fashion.

As is explained in more detail below, the coding control component 340 receives information from the block processing component 342 as macroblocks are processed, from the rate control component 344, and from the slice cap decision component 348, and uses the information to control the operation of various components in the block processing component 342. For example, the coding control component 340 provides information regarding quantization scales determined by the rate control component 344 to various components of the block processing component 342 as needed.

In another example, when H.241 is used, the coding control component 340 controls when a new slice is started by entropy encoder 334 of the block processing component 342. The coding control component 340 may determine that a new slice is to be started under at least three circumstances: when initiating the encoding of new picture, when adding the current entropy coded macroblock to the current slice will cause the slice to exceed a maximum NAL size as mandated by H.241, and in response to an indication from the slice cap decision component 348 that a new slice is to be initiated. Starting a new slice responsive to an indication from the slice cap decision component 348 is described below in reference to FIGS. 4 and 5.

The coding control component 340 may use any suitable technique for determining that the addition of the current entropy coded macroblock to the current slice will cause the slice to exceed a maximum NAL size as follows. For example, the coding control component 340 may make the determination as follows. The coding control component 340 monitors the slice size by accumulating the encoded size of each macroblock in the slice after processing by the entropy encoder 334. After the entropy encoder 334 codes a macroblock but before the entropy coded macroblock is released for inclusion in the current slice, the coding control component 340 compares the current slice size with the addition of the entropy coded macroblock with the maximum NAL size. If the comparison result indicates that the maximum NAL size will be exceeded, the coding control component 340 causes the block processing component 342 to end the current slice and start a new slice with the macroblock, rewinding the encoding pipeline as needed to process the macroblocks in the pipeline as needed for the new slice. Otherwise, the coding control component 340 allows the addition of the entropy coded macroblock to the current slice.

Referring back to FIG. 3A, the block processing component 342 receives macroblocks from the coding control component 340 and encodes the macroblocks under the control of the coding control component 340 to generate the compressed video stream. FIG. 3B shows the basic coding architecture of the block processing component 342. One of ordinary skill in the art will understand that the components of this architecture may be mapped to pipelined encoding modules in an embedded system as previously described herein. The macroblocks 300 from the coding control component 340 are provided as one input of a motion estimation component 320, as one input of an intra prediction component 324, and to a positive input of a combiner 302 (e.g., adder or subtractor or the like). Further, although not specifically shown, the prediction mode of each picture as selected by the coding control component 340 is provided to a mode decision component 326, and the entropy encoder 334.

The storage component 318 provides reference data to the motion estimation component 320 and to the motion compensation component 322. The reference data may include one or more previously encoded and decoded macroblocks, i.e., reconstructed macroblocks.

The motion estimation component 320 provides motion estimation information to the motion compensation component 322 and the entropy encoder 334. More specifically, the motion estimation component 320 performs tests on macroblocks based on multiple temporal prediction modes using reference data from storage 318 to choose the best motion vector(s)/prediction mode based on a coding cost. To perform the tests, the motion estimation component 320 may divide each macroblock into prediction units according to the unit sizes of prediction modes and calculate the coding costs for each prediction mode for each macroblock. The coding cost calculation may be based on the quantization scale for a macroblock as determined by the rate control component 344.

The motion estimation component 320 provides the selected motion vector (MV) or vectors and the selected prediction mode for each inter-predicted macroblock to the motion compensation component 322 and the selected motion vector (MV) to the entropy encoder 334. The motion compensation component 322 provides motion compensated inter-prediction information to the mode decision component 326 that includes motion compensated inter-predicted macroblocks and the selected temporal prediction modes for the inter-predicted macroblocks. The coding costs of the inter-predicted macroblocks are also provided to the mode decision component 326.

The intra-prediction component 324 provides intra-prediction information to the mode decision component 326 that includes intra-predicted macroblocks and the corresponding spatial prediction modes. That is, the intra prediction component 324 performs spatial prediction in which tests based on multiple spatial prediction modes are performed on macroblocks using previously encoded neighboring macroblocks of the picture from the buffer 328 to choose the best spatial prediction mode for generating an intra-predicted macroblock based on a coding cost. To perform the tests, the intra prediction component 324 may divide each macroblock into prediction units according to the unit sizes of the spatial prediction modes and calculate the coding costs for each prediction mode for each macroblock. The coding cost calculation may be based on the quantization scale for a macroblock as determined by the rate control component 344. Although not specifically shown, the spatial prediction mode of each intra predicted macroblock provided to the mode decision component 326 is also provided to the transform component 304. Further, the coding costs of the intra predicted macroblocks are also provided to the mode decision component 326.

The mode decision component 326 selects a prediction mode for each macroblock based on the coding costs for each prediction mode and the picture prediction mode. That is, the mode decision component 326 selects between the motion-compensated inter-predicted macroblocks from the motion compensation component 322 and the intra-predicted macroblocks from the intra prediction component 324 based on the coding costs and the picture prediction mode. The output of the mode decision component 326, i.e., the predicted macroblock, is provided to a negative input of the combiner 302 and to a delay component 330. The output of the delay component 330 is provided to another combiner (i.e., an adder) 338. The combiner 302 subtracts the predicted macroblock from the current macroblock to provide a residual macroblock to the transform component 304. The resulting residual macroblock is a set of pixel difference values that quantify differences between pixel values of the original macroblock and the predicted macroblock.

The transform component 304 performs unit transforms on the residual macroblocks to convert the residual pixel values to transform coefficients and provides the transform coefficients to a quantize component 306. The quantize component 306 quantizes the transform coefficients of the residual macroblocks based on quantization scales provided by the coding control component 340. For example, the quantize component 306 may divide the values of the transform coefficients by a quantization scale (Qs). In some embodiments, the quantize component 306 represents the coefficients by using a desired number of quantization steps, the number of steps used (or correspondingly the value of Qs) determining the number of bits used to represent the residuals. Other algorithms for quantization such as rate-distortion optimized quantization may also be used by the quantize component 306.

Because the DCT transform redistributes the energy of the residual signal into the frequency domain, the quantized transform coefficients are taken out of their scan ordering by a scan component 308 and arranged by significance, such as, for example, beginning with the more significant coefficients followed by the less significant. The ordered quantized transform coefficients for a macroblock provided via the scan component 308 along with header information for the macroblock and the quantization scale used are coded by the entropy encoder 334, which provides a compressed bit stream to a video buffer 336 for transmission or storage. The entropy coding performed by the entropy encoder 334 may be use any suitable entropy encoding technique, such as, for example, context adaptive variable length coding (CAVLC), context adaptive binary arithmetic coding (CABAC), run length coding, etc.

The entropy coding component 334 is also responsible for generating and adding slice header information to compressed bit stream when a new slice is started. As was previously discussed, the coding control component 340 controls when the entropy coded bits of a macroblock are released into the compressed bit stream and also controls when a new slice is to be started.

Inside the block processing component 342 is an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a macroblock provided via the scan component 308 are returned to their original post-transform arrangement by an inverse scan component 310, the output of which is provided to a dequantize component 312, which outputs estimated transformed information, i.e., an estimated or reconstructed version of the transform result from the transform component 304. The dequantize component 312 performs inverse quantization on the quantized transform coefficients based on the quantization scale used by the quantize component 306. The estimated transformed information is provided to the inverse transform component 314, which outputs estimated residual information which represents a reconstructed version of a residual macroblock. The reconstructed residual macroblock is provided to the combiner 338.

The combiner 338 adds the delayed selected macroblock to the reconstructed residual macroblock to generate an unfiltered reconstructed macroblock, which becomes part of reconstructed picture information. The reconstructed picture information is provided via a buffer 328 to the intra-prediction component 324 and to a filter component 316. The filter component 316 is an in-loop filter which filters the reconstructed picture information and provides filtered reconstructed macroblocks, i.e., reference data, to the storage component 318.

The components of the video encoder of FIGS. 3A and 3B may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software instructions may be initially stored in a computer-readable medium such as compact disc (CD), a diskette, a tape, a file, memory, or any other computer readable storage device, and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 4:
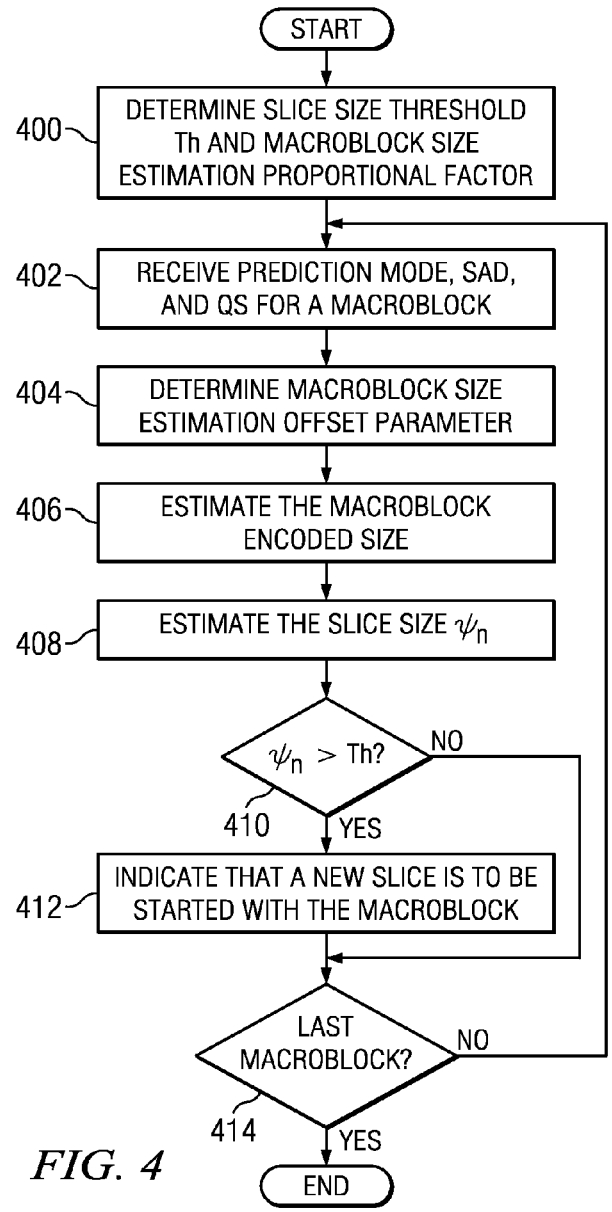
FIGS. 4 and 5 are flow diagrams of methods.
Figure 5:
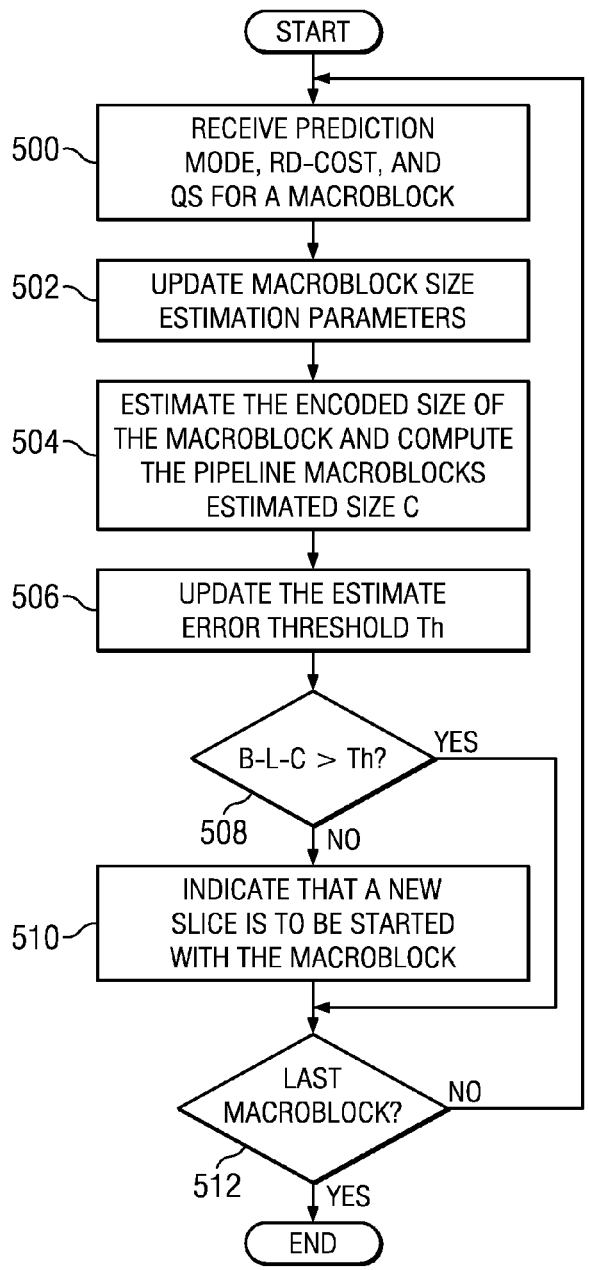

FIGS. 4 and 5 show flow diagrams of slice cap decision methods that may be implemented by the slice cap decision component 348 of the video encoder of FIGS. 3A and 3B. These methods are described with respect to this video encoder merely for illustration. As will be apparent to one of ordinary skill in the art having benefit of the disclosure provided herein, the methods can be implemented in other devices and using other components.

In the method of FIG. 4, initially a slice size threshold Th and a macroblock size estimation proportional factor ρ are determined for the current picture 400. These values are determined by the slice cap decision component 348 at the beginning of each frame. The slice size threshold Th is computed as $$Th = Th_{act} - k*\delta \quad (1)$$

where $Th_{act}$ is the maximum slice size, k is a tuning parameter, and δ is the average number of bits used to encode a macroblock in the previous frame, i.e., the average encoded size of a macroblock in the previous frame. The value of δ is computed as $$\delta = \frac{bitrate(\text{bits/sec})}{(MBs \text{ per frame}) * (\text{frame rate})}. \quad (2)$$

The maximum slice size $Th_{act}$ may be user specified and/or may be the maximum NAL size specified by H.241 for the particular network in use. The tuning parameter k is used to compensate for error in'estimating macroblock and slice sizes. That is, k*δ is a guard band for the size estimation model, i.e., this product reduces the maximum slice size $Th_{act}$ to Th to allow for some estimation error without exceeding the maximum slice size $Th_{act}$. The tradeoff in selecting the value of k is bit wastage due to capping slices at less than $Th_{act}$ versus increased overhead for pipeline rewinding when the size estimated by the size estimation model is incorrect. The value of k may be a constant determined by simulation, user-specified, and/or dynamically adjusted based on estimation error.

The macroblock size estimation proportional factor ρ is computed as $$\rho = \frac{(\varphi_h - \varphi_l)}{(Rd_H - Rd_L)} \quad (3)$$

where $\varphi_h$ and $\varphi_l$ are the average encoded sizes of the macroblocks in the previous picture having rate distortion $Rd_H$ and $Rd_L$, respectively, where $Rd_L$ is the lowest rate distortion in the previous picture such that the number of macroblocks having a rate distortion value $Rd_L$ is above a threshold number, and $Rd_H$ is the highest rate distortion in previous picture such that the number of macroblocks having a rate distortion value $Rd_H$ is above a threshold number of macroblocks. As is explained in more detail below, a rate distortion value is determined for each macroblock when the slice cap decision is made for that macroblock. The threshold number of macroblocks is a tuning parameter that may be predetermined based on simulation results and/or may be user specified. The criteria for choosing the threshold may depend on the type of video being encoded. For example if the video content is plain, with little texture and detail, then the threshold values will be higher as most of the macroblocks are similar. However, if the video has a lot of detail and texture and motion, then these values will be small.

To determine $Rd_L$, the minimum Rd for the previous picture is determined along with the number of macroblocks having that minimum Rd. If the number of macroblocks having that minimum Rd is above the user-specified number, then $Rd_L$=Rd. Otherwise, the next lowest Rd for the previous picture is considered. The process continues until the lowest Rd with a number of macroblocks having that Rd greater than the user specified number is found. The value of $\varphi_l$ is then determined as the average of the number of macroblocks havening the selected Rd value. The value of $Rd_H$ and $\varphi_h$ may be similarly determined starting with the maximum Rd of the previous picture.

Consider the following example. For the previous picture, one thousand macroblocks were coded and the user-specified number of macroblocks for determining $Rd_H$ and $Rd_L$ is 10. The lowest Rd value for the one thousand macroblocks was 100, the next lowest Rd value was 110, the highest Rd value was 200, and the second highest Rd value was 180. Eight macroblocks had Rd=100, 15 macroblocks had Rd=110, 20 macroblocks had Rd=180 and 7 macroblocks had Rd=200. The value of $Rd_L$ will be 110 and $\phi_l$ will be the average encoded size of the 15 macroblocks. Similarly, the value of $Rd_H$ will be 180 and $\phi_h$ will be the average encoded size of the 20 macroblocks.

Referring again to FIG. 4, once the picture level values are determined 400, a slice cap decision using these values is made for each macroblock in the picture after the prediction mode is determined for the macroblock by the mode decision component 326 and before the macroblock is moved to the next processing stage in the encoder pipeline 402-414. The prediction mode, the sum-of-absolute-differences (SAD), and the quantization scale (QS) for a macroblock are received 402. The SAD for the macroblock is the SAD computed by the motion estimation component 320 or the intra prediction component 324 for the prediction mode selected by the mode decision component 326. The received prediction mode is used to determine which SAD value to use. The QS for the macroblock is determined by the rate control component 344.

The macroblock size estimation offset parameter $\epsilon$ is then determined based on proportional factor $\rho$ and the rate distortion and encoded sizes of macroblocks neighboring the current macroblock in the picture 404. More specifically, the offset parameter $\epsilon$ is computed as $$\epsilon = \text{median}(\epsilon_1, \epsilon_2, \epsilon_3) \quad (4)$$

where $\epsilon_1$, $\epsilon_2$, and $\epsilon_3$, are offset factors for the top, top left, and top right neighboring macroblocks computed as $$\epsilon_1 = \phi'_1 - \rho Rd_1$$
$$\epsilon_2 = \phi'_2 - \rho Rd_2$$
$$\epsilon_1 = \phi'_3 - \rho Rd_3 \quad (5)$$

where $\phi'_1$, $\phi'_3$, $\phi'_3$ are the encoded sizes and $Rd_1$, $Rd_2$, $Rd_3$ are the rate distortions of, respectively, the top, top left, and the top right neighboring macroblocks of the current macroblock. As is explained in more detail below, a rate distortion value is determined for each macroblock as part of making the slice cap decision for that macroblock. If one or more of the neighboring macroblocks are not available, e.g., for border macroblocks, then the values for the available neighboring macroblocks may be used. Default values may also be used.

The encoded size of the current macroblock is then estimated 406. More specifically, the estimated encoded size of the current macroblock $\phi_n$ is computed as per $$\phi_n = \rho Rd + \epsilon;$$
$$\text{if } Rd > Rd_H \text{ then } \phi_n = (\phi_n + \phi'_{nc})/2 \quad (6)$$

where $\phi'_{nc}$ is the encoded size of the co-located macroblock in the previous picture, i.e., the macroblock in the previous picture at the same location as the current macroblock in the current picture, and Rd is the rate distortion for the current macroblock. The rate distortion Rd for the current macroblock is computed as $$Rd = SAD/Qs^2 \quad (7)$$

The slice size $\psi_n$ with the addition of the current macroblock is then estimated 408. The estimated slice size $\psi_n$ is computed as $$\psi_n = (\psi_{n-1} - \phi_{n-p} - \psi'_{n-p} + \phi_n) \quad (8)$$

where $\psi_{n-1}$ is the estimated slice size when the slice cap decision was made for the previous macroblock, p is the number of pipeline processing stages to be performed after the slice cap decision for a macroblock before the encoded value of that macroblock is known, i.e., the pipeline delay from mode decision to entropy coding, $\phi'_{n-p}$ is the encoded size of the macroblock entropy coded at the same time the mode decision was made for the current macroblock, and $\phi_{n-p}$ is the encoded size estimated for that macroblock when the slice cap decision was made for that macroblock. Note that $\psi_n$ is the sum of the actual encoded sizes of previously entropy coded macroblocks in the slice and the estimated sizes of the p macroblocks still in the pipeline.

A check is then made to determine if the estimated slice size $\psi_n$ is greater than the slice size threshold Th 400. If this condition is not true, processing continues with the next macroblock in the picture, if any 414. If the condition is true, then a new slice is to be started with the current macroblock 412. That is, the slice cap decision component 348 indicates to the coding control component 340 that a new slice is to be started with the current macroblock. Also, any data stored for estimating the slice size, e.g., the previous estimated slice size $\psi_{n-1}$ and estimated sizes of macroblocks in the pipeline, is reset for a new slice. For example, the previous estimated slice size $\psi_{n-1}$ may be set to the estimated size of the current macroblock $\phi_n$. Note that the current macroblock will also be considered to be the only macroblock in the pipeline for purposes of slice size calculation for the next macroblock. Processing then continues with the next macroblock in the picture 414, if any.

When the slice cap decision component 348 indicates to the coding control component 340 that a new slice is to be started with the current macroblock, the coding control component 340 causes the mode decision component 326 to change the prediction mode of the current macroblock to the best inter-predicted mode if the prediction mode selected for the macroblock is an intra-prediction mode. This change is made because intra-prediction relies on previously coded macroblocks in the same picture and slices should be independently decodable, i.e., decoding a macroblock in one slice cannot rely on data from another slice in the same picture. The coding control component 340 will also cause the entropy encoder 334 to terminate the current slice and start a new slice when the current macroblock reaches the entropy coding pipeline stage. If the rate control component 344 considers slice size in determining quantization scales, the coding control component 340 will indicate to the rate control component 344 that a new slice is to be started with the current macroblock.

Note that if the slice size estimation performed by the slice cap decision component 348 underestimates when the maximum slice size will be reached, the coding control component 340 may terminate the slice before the current macroblock reaches the entropy coding stage of the pipeline. In such a case, as was previously explained, the pipeline is rewound (partially or fully) as needed to reprocess macroblocks in the pipeline for the new slice. Further, any cumulative size data used in slice size estimation for the slice cap decision is reset for the new slice.

An embodiment of the scan cap decision method of FIG. 4 was evaluated using a representative set of video conferencing test cases in a base line profile H.264 video encoder. The maximum slice size, $H_{max}$, was set to 1300 bytes. Two measurements were taken for each test case: percentage of traverse back and percentage of bits wasted. The percentage of traverse back measurement indicates how many times the pipeline was rewound and macroblocks re-encoded when a new slice was started. This measurement indicates how often the slice cap decision was not made at the proper time due to underestimating the encoded slice size, thus requiring pipeline rewinding and macroblock re-encoding to start a new slice. The percentage of bits wasted measurement indicates how many bits were wasted, i.e., not used in the maximum encoded slice size, when a new slice was started. Without the early slice cap decision method, the percentage of bits wasted is 0% and the percentage of traverse back is 100% because a starting new slice always requires pipeline rewinding and macroblock re-encoding. With the early slice cap decision method, the traverse back rate across all the test sequences was, on average, approximately 8% with approximately 1% of bits wasted.

The method of FIG. 5 is performed for each macroblock in a picture after the prediction mode for the macroblock is determined by the mode decision component 326 and before the macroblock is moved to the next processing stage in the encoder pipeline. In this method, the encoded size of the ith macroblock is estimated as $$est\_mb\_rate_i = a_i(rd\_cost_i/qstep_i) + b_i \quad (9)$$

where $rd\_cost_i$ is the rate distortion cost for the macroblock, $qstep_i$ is the quantization scale (QS) for the macroblock, and $a_i$ and $b_i$ are size estimation parameters representative of the accuracy of the size estimations for some number of previously encoded macroblocks. The encoded size of a macroblock decreases when QS increases; hence, in Eq. 9, the rd_cost of a macroblock is scaled by the QS for the macroblock to compensate for the effect of changing QS from one macroblock to another which could reduce the accuracy of the size estimation.

As is explained in more detail below, the size estimation parameters $a_i$ and $b_i$ may be adapted for each macroblock based on the actual encoded sizes and rd_costs of previously encoded macroblocks. Further, the slice cap decision is based on an estimation error threshold Th that is adapted for each macroblock based on estimation error, i.e., the difference between the actual and estimated encoded sizes of macroblocks, for some number of previously encoded macroblocks.

In the method of FIG. 5, initially the prediction mode, the rd_cost, and the QS for a macroblock are received 500. The QS for the macroblock is determined by the rate control component 344. The prediction mode denotes one of intra and inter prediction. Each prediction mode may have a separate rate mode as defined in Eq. 9. The rd_cost for a macroblock is the rd_cost computed by the motion estimation component 320 or the intra prediction component 324 for the prediction mode selected by the mode decision component 326. Any suitable technique may be used to determine the rd_cost. For example, for H.264/AVC, the rd_cost for intra-prediction is computed as $$rd\_cost = SAD + \lambda x$$

where SAD is the sum-of-the-absolute-differences computed for the macroblock, λ is a weighting factor, and x is the intra prediction mode cost, and the rd_cost for inter-prediction is computed as $$rd\_cost = SAD + \lambda x$$

where SAD is the sum-of-the-absolute-differences computed for the macroblock, λ is a weighting factor and x is the motion vector cost. Note that λ can be different for intra and inter macroblocks.

The macroblock size estimation parameters a and b (see Eq. 9) are then updated, i.e., adapted, based on the actual encoded size and rd_cost of the macroblock entropy coded concurrently with the mode decision for the current macroblock 502. In some embodiments, a single set of macroblock size estimation parameters is maintained and updated. In some embodiments, two sets of macroblock size estimation parameters are maintained, one for inter-coded macroblocks and one for intra-coded macroblocks. In such embodiments, the inter-coded macroblock size estimation parameters are updated if the macroblock is inter-coded and the intra-coded macroblock size estimation parameters are updated if the macroblock is intra-coded.

Figure 6:
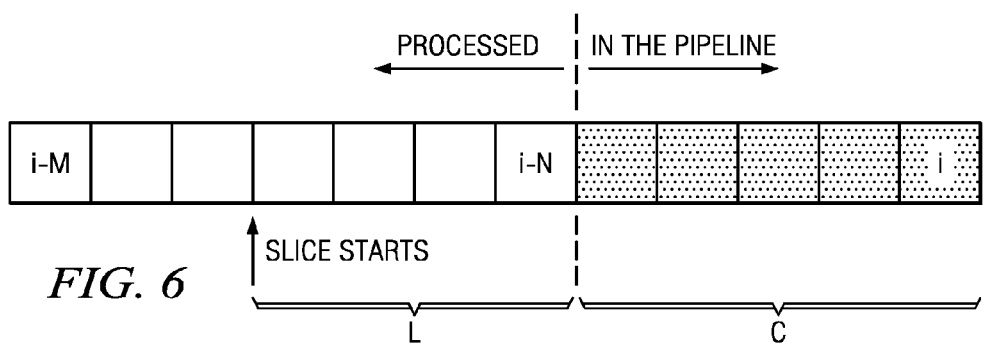
FIG. 6 is an example of macroblock processing.

Given the actual encoded sizes and rd_costs of previously entropy-coded macroblocks, the size estimation parameters a and b can be found by minimizing the following cost function $$\min_{a_i, b_i, \text{for } k \in [i-M, i-N]} \|mb\_rate_k - (a_i(rd\_cost_k/qstep_k) + b_i)\|_2^2 \quad (10)$$

where $mb\_rate_k$ is the actual encoded size of the kth macroblock. Referring now to FIG. 6, the minimization is done over (i-M)th to (i-N)th macroblocks. That is, to determine the size estimation parameters of the ith macroblock, i.e., $a_i$ and $b_i$, the actual encoded sizes and rd_costs of the most recently encoded M−N+1 macroblocks are used. Note that macroblock i-N is the macroblock that was entropy coded concurrently with the mode decision for the current macroblock. N is the pipeline depth from the mode decision to entropy coding. The value of M is determined by the value of N and the number of macroblocks (whose actual encoded size is known) used for rate-model fitting. Note that the macroblocks used for model fitting may or may not have a continuous macroblock index. That is, as previously explained, a single set of macroblock size estimation parameters may be maintained, in which case the index would be continuous, or both inter and intra macroblock size estimation parameters may be maintained, in which case the index would not necessarily be continuous. The macroblocks considered in the determination of a and b may cross slice boundaries. In some embodiments, the macroblocks considered may also cross frame boundaries. Note that the number of macroblocks used to calculate the size estimation parameters may affect the accuracy of the size estimation. To avoid over-fitting the data, a sufficiently large number of macroblocks should be used, e.g., M+N−1>50.

The solution to Eq. 10 can be determined as $$\alpha_i = (M - N + 1) \times \sum_{k=i-N}^{i-M} x_k y_k - \sum_{k=i-N}^{i-M} x_k \sum_{k=i-N}^{i-M} y_k \quad (11)$$

$$\beta_i = \sum_{k=i-N}^{i-M} x_k^2 \sum_{k=i-N}^{i-M} y_k - \sum_{k=i-N}^{i-M} x_k \sum_{k=i-N}^{i-M} x_k y_k$$

$$\tau_i = (M - N + 1) \times \sum_{k=i-N}^{i-M} x_k^2 - \left(\sum_{k=i-N}^{i-M} x_k\right)^2$$

$$a_i = \frac{\alpha_i}{\tau_i}, \; b_i = \frac{\beta_i}{\tau_i}$$

where $x_k = (rd\_cost_k/qstep_k)$ and $y_k = mb\_rate_k$. The interim values α, β, and τ provide a simplified way of performing least squares regression to an observed set of data. The interim values provide regression results in terms of sum of the actual rates, sum of the estimated rates, and sum of the product of the actual and estimated rates.

The number of calculations needed to compute a and b for a macroblock may be reduced by keeping the summations in Eq. 11 moving. That is, when calculating the size estimation parameters for successive macroblocks, a new value comes into sum and an old one drops out. For example, the moving summation approach for computing a term in the size estimation parameter adaptation of two successive macroblocks (i)'th and (i+1)'th may be $$sum_i = \sum_{k=i-N}^{i-M} x_k y_k \qquad (12)$$

$$sum_{i+1} = \sum_{k=i-N+1}^{i-M+1} x_k y_k$$

$$sum_{i+1} = sum_i - x_{i-M} y_{i-M} + x_{i-N+1} y_{i-N+1}$$

Referring again to FIG. 5, the encoded size of the macroblock is estimated using the updated macroblock size estimation parameters and the pipeline macroblocks estimated size $C_E$ is computed using the estimated encoded size of the macroblock 504. The encoded size of the macroblock is estimated as per Eq. 9. The pipeline macroblocks estimated size C is the sum of the estimated sizes of the macroblocks currently in the encoding pipeline from the mode decision stage to the entropy coding stage, i.e., $$C = \sum_{k=i}^{i-N+1} est\_mb\_rate_k \qquad (13)$$

The estimation error threshold Th is then adapted for the current macroblock 506. The adaptation of the estimation error threshold Th is explained in more detail below. The slice cap decision is then made based on the threshold Th, the pipeline macroblocks estimated size C, the current actual encoded size of the slice L, and the maximum slice size B 508. The maximum slice size B may be user specified and/or may be the maximum NAL size specified by H.241 for the particular network in use. More specifically, if the difference between the maximum slice size B and the estimated size of the slice (C+L) exceeds the estimation error threshold Th, a new slice is to be started with the current macroblock.

When the slice cap decision 508 is not to start a new slice, processing continues with the next macroblock in the picture 512, if any. When the slice cap decision 508 is to start a new slice, an indication that a new slice is to be started with the current macroblock is sent to the coding control component 510. Also, any data stored for estimating the slice size for the slice cap decision that does not continue across slice boundaries, e.g., the pipeline macroblocks estimated size C and the current actual encoded slice size L, is reset for a new slice. Note that the current macroblock will also be considered to be the only macroblock in the pipeline for purposes of the pipeline macroblocks estimated size C calculation for the next macroblock as the other macroblocks currently in the pipeline in front of the current macroblock will be part of the current slice. Processing then continues with the next macroblock in the picture 512, if any.

When the slice cap decision component 348 indicates to the coding control component 340 that a new slice is to be started with the current macroblock, the coding control component 340 causes the mode decision component 326 to change the prediction mode of the current macroblock to an intra-prediction mode. The coding control component 340 will also cause the entropy encoder 334 to terminate the current slice and start a new slice when the current macroblock reaches the entropy coding pipeline stage. If the rate control component 344 considers slice size in determining quantization scales, the coding control component 340 will indicate to the rate control component 344 that a new slice is to be started with the current macroblock.

The adaptation of the error estimation threshold Th for the slice cap decision is now explained. The macroblock size estimation of Eq. 9 is expected to produce errors. However, with knowledge of the statistics of the errors, a reliable slice cap decision with a given failure rate can be made. In general, the difference between the actual encoded size and estimated size of a macroblock (or group of macroblocks) is the estimation error. This estimation error can be modeled with a zero mean Laplacian distribution such that the slice cap decision can be adapted to the results of the past estimation performance.

FIG. 6 shows an example in which there are five macroblocks in the pipeline with a pipeline macroblocks estimated size of C, and four macroblocks in the current slice that have been encoded with an actual encoded slice size L. The macroblock i is the macroblock for which the slice cap decision is to be made. The slice cap decision is whether or not the sum of L and C exceeds the maximum slice size B. Note that this decision requires an estimated encoded size L for the N macroblocks in the pipeline in front of macroblock i.

Estimation error may be defined as $$error = C_A - C_E \qquad (14)$$

where $C_A$ is the sum of the actual encoded sizes of N macroblocks and $C_E$ is the sum of the estimated sizes of the N macroblocks, i.e., $$C_A = \sum_{k=i}^{i-N+1} mb\_rate_k, \qquad (15)$$

$$C_E = \sum_{k=i}^{i-N+1} est\_mb\_rate_k.$$

Figure 7:
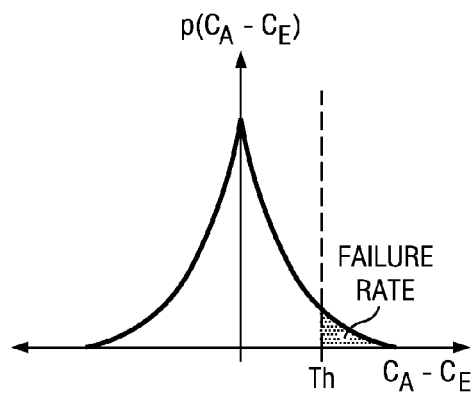
FIG. 7 is a graph illustrating the probability density distributions for estimation error.

FIG. 7 generally illustrates the distribution of the estimation error for N macroblocks.

The number of times $C_A$ exceeds (B−L) given $C_E$ is the failure rate and can be written as $$P(C_A > B - L | C_E) = P(C_A - C_E > B - L - C_E) = 1 - F_{C_A - C_E}(B - L - C_E) \qquad (16)$$

where $F_{C_A - C_E}$ is the cumulative distribution function of the error $C_A - C_E$ of FIG. 7. A predetermined failure rate can be achieved by altering the threshold Th shown in FIG. 7 adaptively when making the slice cap decision.

Using the properties of Laplacian distribution of the estimation error, the error estimation threshold Th may be adaptively calculated for a given failure rate as follows IF failure_rate > 0.5 $\qquad (17)$ $$Th = \frac{1}{\sqrt{2}} \ln(2 - 2 \times failure\_rate) \times \sigma_{error}$$

ELSE $$Th = \frac{1}{\sqrt{2}} \ln(2 \times failure\_rate) \times \sigma_{error}$$

where $\sigma_{error}$ is the standard deviation of the estimation error. The value of $\sigma_{error}$ may be calculated at each slice cap decision as $$\sigma_{error} = \left( \frac{1}{(R-N+1)} \sum_{k=i-N}^{i-R} \text{error}_k^2 - \frac{1}{(R-N+1)^2} \sum_{k=i-N}^{i-R} \text{error}_k \times \sum_{k=i-N}^{i-R} \text{error}_k \right)^{1/2} \quad (18)$$

where i is the current macroblock number and R is the size of an array storing the previous error values. Since error values for the previous N macroblocks are not available as those macroblocks are being processed in the pipeline, the available R−N error values are used. The running summations for the successive calculations of $\sigma_{error}$ can be calculated similar to Eq. 12.

The value of $\sigma_{error}$ may also be calculated as $$\sigma_{error} = (\text{var}_i)^{1/2}$$

where $$\text{var}_i = (1-\alpha)*\text{var}_{i+1} + \alpha*(\text{error} - \text{mean}_i)^2$$

$$\text{mean}_i = (1-\alpha)*\text{mean}_{i-1} + \alpha*\text{error}$$

where $\alpha$ is an empirically determined adaptation parameter, e.g., 0.95. Note that this calculation technique eliminates the need for remembering past error values.

The value of $\sigma_{error}$ may also be computed as per the pseudo code of Table 1. In this pseudo code, $\alpha=16$, and $K=k^2$ (see Eq. 18).

TABLE 1

```
estError = actBits[N] − estBits[N];
mean+ = (α * (estError − mean)) >> 8;
estVar = (estError − mean) * (estError − mean);
variance+ = (α * (estVar − variance)) >> 8;
if (variance > 3200) variance = 3200;
elseif (variance < 0) {variance = 100; mean = 0};
Threshold = K * variance;
```

Two simulations were performed to evaluate an embodiment of the early slice cap decision method of FIG. 5. The results of these simulations are shown in Table 2. In both simulations, a representative sixty second video conference video sequence was encoded at three different bitrates (768 k-1500 k-3000 k) with CABAC and CAVLC encoding. The first simulation, referred to as ECD in Table 1, made the slice cap decision after entropy coding when the exact encoded size of a macroblock was known. The second simulation, referred to as EST in Table 1, used the embodiment of the early slice cap decision method of FIG. 5. Two parameters were considered in judging the performance of the early slice cap decision method, the percentage increase in the number of slices as compared to the ECD simulation and the number of failures, i.e., the number of times a slice exceeded the maximum slice size. As can be seen in Table 1, the use of the early slice cap decision method increased the total number of slices by only 2-7% with one or zero failures. The failure rate used was one failure for every sixty seconds of video.

TABLE 2

| Sequence Name | % Increase in # of slices | # of Failures | Time Period of Video (secs) | ECD Mean of unused slice budget (bytes) | EST Mean of unused slice budget (bytes) | Increase in unused slice budget (bytes) |
|---|---|---|---|---|---|---|
| CABAC @ 768 Kbits/sec | 2.69 | 1 | 60 | 144.0613 | 176.6349 | 32.5736 |
| CAVLC @ 768 Kbits/sec | 2.2 | 0 | 60 | 148.1932 | 174.5433 | 26.3501 |
| CABAC @ 1.5 Mbits/sec | 6.1 | 0 | 60 | 74.7973 | 151.0414 | 76.2441 |
| CAVLC @ 1.5 Mbits/sec | 6.22 | 1 | 60 | 74.9832 | 152.2195 | 77.2363 |
| CABAC @ 3 Mbits/sec | 6.14 | 0 | 60 | 43.0811 | 122.9744 | 79.8933 |
| CAVLC @ 3 Mbits/sec | 6.41 | 1 | 60 | 43.5844 | 126.7655 | 83.1811 |

One possible fixed point implementation of the early slice cap decision method of FIG. 5 is now described. The macroblock size estimation of Eq. 9 can be approximated as follows. Given the $rd\_cost_j$ and quantization step $qstep_j$ of a macroblock, the quantized rd_cost, $q\_rd\_cost_j$, is defined as $$q\_rd\_cost_j = (rd\_cost_j * qScaleTab[qstep_j]) >> 11 \quad (19)$$

where qScaleTab[ ] is defined as $qScaleTab[52] =$

{4096, 3649, 3250, 2896, 2580, 2298, 2048, 1824, 1625, 1448, 1290, 1149, 1024, 912, 812, 724, 645, 574, 512, 456, 406, 362, 322, 287, 256, 228, 203, 181, 161, 143, 128, 114, 101, 90, 80, 71, 64, 57, 50, 45, 40, 35, 32, 28, 25, 22, 20, 17, 16, 14, 12, 11}.

Given the selected prediction mode (intra or inter) for the macroblock and the corresponding quantized rd_cost, the estimated encoded size for a macroblock is defined as $$\text{estimate\_mb\_rate}_j = (a_j * q\_rd\_cost_j >> 8) + b_j \quad (20)$$

Given $\alpha_j$, $\beta_j$, and $\tau_j$ as per Eq. 11, the size estimation parameters $a_j$ and $b_j$ may be computed as per the example pseudo code in Table 3. Note that there are separate size estimation parameters for intra and inter-coded macroblocks. That is, values of $\alpha_j$, $\beta_j$ and $\tau_j$ will be different depending upon whether the macroblock is intra or inter-coded.

TABLE 3

| Pseudo code | Comment |
|---|---|
| Shift = MSB_location($\tau_j$) −8;<br>If (shift < 0) shift = 0; | Find the bit location of the most significant bit of $\tau_j$. For example, MSB_location(556) = 10; MSB_location(1) = 0; |
| $\alpha_j = \alpha_j$ >> shift;<br>$\beta_j = \beta_j$ >> shift;<br>$\tau_j = \tau_j$ >> shift; | Reduce the dynamic range of $\alpha_j$, $\beta_j$ and $\tau_j$ to 8 bits so that division can be replaced with a table look up and right shift |
| abs_t = abs($\tau_j$)<br>If ($\tau_j$ != 0) {<br>    $a_j$ = ($\alpha_j$ * t_tab[abs_t]) >>4;<br>    $b_j$ = ($\beta_j$ * t_tab[abs_t]) >> 12;<br>    if ($\tau_j$ < 0) {.$a_j$ = − $a_j$; $b_j$ = −$b_j$; }<br>    }<br>else<br>    { $a_j$ = 205; $b_j$ = 0 ;} | Absolute value of $\tau_j$<br>Compute the rate model parameter $a_j$ and $b_j$ with table look up and right shift<br><br><br><br><br>Set the rate model parameters $a_j$ and $b_j$ to default values if $\tau_j$ is zero. |

For the example of Table 3, the look up table t_tab is defined as:

t_tab[256] =

{4096, 4096, 2048, 1365, 1024, 819, 682, 585, 512, 455, 409, 372, 341, 315, 292, 273, 256, 240, 227, 215, 204, 195, 186, 178, 170, 163, 157, 151, 146, 141, 136, 132, 128, 124, 120, 117, 113, 110, 107, 105, 102, 99, 97, 95, 93, 91, 89, 87, 85, 83, 81, 80, 78, 77, 75, 74, 73, 71, 70, 69, 68, 67, 66, 65, 64, 63, 62, 61, 60, 59, 58, 57, 56, 56, 55, 54, 53, 52, 51, 51, 50, 49, 49, 48, 48, 47, 47, 46, 46, 45, 45, 44, 44, 43, 43, 42, 42, 41, 41, 40, 40, 40, 39, 39, 39, 38, 38, 37, 37, 37, 36, 36, 36, 35, 35, 35, 35, 34, 34, 34, 33, 33, 33, 33, 32, 32, 32, 32, 31, 31, 31, 31, 30, 30, 30, 30, 29, 29, 29, 29, 29, 28, 28, 28, 28, 28, 27, 27, 27, 27, 27, 26, 26, 26, 26, 26, 26, 25, 25, 25, 25, 25, 25, 24, 24, 24, 24, 24, 24, 24, 23, 23, 23, 23, 23, 23, 23, 23, 22, 22, 22, 22, 22, 22, 22, 22, 21, 21, 21, 21, 21, 21, 21, 21, 21, 20, 20, 20, 20, 20, 20, 20, 20, 20, 19, 19, 19, 19, 19, 19, 19, 19, 19, 19, 19, 18, 18, 18, 18, 18, 18, 18, 18, 18, 18, 18, 18, 17, 17, 17, 17, 17, 17, 17, 17, 17, 17, 17, 17, 17, 16, 16, 16, 16, 16, 16, 16, 16, 16, 16, 16, 16, 16, 16, 16}.

To compute the adaptive estimation error threshold Th, an infinite impulse response (IIR) filter may be used. That is, the threshold Th may be computed as per the example pseudo code of Table 4. For this example pseudo code, the initial values of mean and $\sigma_{error}^2$ are set to 0 and 100, respectively. The scaling factor K is explained in more detail below.

TABLE 4

| Pseudo code | Remark |
|---|---|
| error = mb_rate$_k$ − est_mb_rate$_k$ | Bit estimation error for the current MB$_k$ which is just encoded |
| mean = mean + ((alpha*(error − means))>>8); | Update mean, alpha = 16 |

TABLE 4-continued

| Pseudo code | Remark |
|---|---|
| buf = (error − mean)*(error − mean);<br>$\sigma_{error}^2 = \sigma_{error}^2$ + ((alpha*(buf − $\sigma_{error}^2$))>>8);<br>Th$^2$ = K * $\sigma_{error}^2$; | Update the variance $\sigma_{error}^2$, alpha = 16<br><br>Compute the square of Threshold, K is pre-defined scaling factor based on failure rate. |

Note that above example pseudo code computes the square of the adaptive estimation error threshold Th. Accordingly, the slice cap decision at step 508 in FIG. 5 would be B−L−C>0 and (B−L−C)$^2$>Th$^2$. With this change, the expensive square root operation on $\sigma_{error}^2$ of Eq. 18 is avoided.

The slice cap decision method of FIG. 5 and the fixed point implementation example described thus far reduces the failure (slice rewind) rate in average sense. In video conferencing applications, every frame needs to be encoded in real time. For example, for 30 frames per second video, encoding of a frame should complete within 33 ms. If a frame cannot be encoded in real-time, the frame will be dropped. In the frames after scene changes, a large number of macroblocks may be encoded as intra-predicted macroblocks, which consumes a lot bits and produces a large number of slices. If the slice cap decision method cannot guarantee that the slice rewind rate is within a pre-defined threshold to meet the real-time encoding requirements, many of these frames may be dropped. Therefore, in some embodiments, the slice cap decision method not only reduces the average slice rewind rate, but also guarantees the real-time encoding requirements for peak cases so that no frame has to be dropped.

More specifically, by taking advantage of the fact that the number of cycles spent on the encoding of slice headers is much less than the number of cycles for a full slice rewind of the pipeline, more slices can be inserted into an encode picture to reduce the slice rewind rate and boost overall encoding performance for the pictures of peak cases. At the beginning of encoding a picture, the scaling factor K of Table 4 is reset to a pre-defined constant, e.g., 144. The value of K depends on the specified failure rate. For example, as shown in Eq. 17, K is $1/\sqrt{2}$*(ln(2*failure_rate))$^2$. Note that a larger value of K will create a larger number of slices, and fewer slices rewinds.

During the encoding of the picture, the scaling factor K is increased by some multiplicative factor, e.g., 2, whenever the slice cap decision is incorrect, i.e., when the method fails to predict the start of a new slice and a slice rewind results. Further, when the slice cap decision is correct for more than some predetermined number, e.g., 8, of consecutive slices, the value of the scaling factor K is decreased by half. This process is essentially equivalent to changing the failure rate in Eq. 17 dynamically for threshold calculation based on the coding results. The use of the scaling factor K will cause more slices to be generated in the peak cases, but can guarantee the number of slice rewinds is less than a pre-defined number of slice rewinds, e.g., 10 per picture, to meet the real-time encoding requirements for every picture. Example pseudo code for this process for adapting the scaling factor K is shown in Table 5. In this pseudo code, amp is the multiplicative factor for increasing K, Th_count is the number of correct slice decisions for decreasing K, K_init is the initial value of K for each picture and depends on the pre-defined failure rate, and K_min sets the lowest value of K.

TABLE 5

| Pseudo code | Remark |
|---|---|
| Step 0:<br>K = K_init;<br>Success_slice_count = 0; | At the beginning of encoding a frame, set K to a pre-defined value K_init;<br>Set success_slice_count to 0; |
| Step 1:<br>If (slice_rewind) {<br>  If (K < 64) K = 64;<br>    Else K = amp * K;<br>} else {<br>  Success_slice_count ++;<br>} | After encoding a slice, if the slice cap algorithm fails to predict a new slice and results in a slice rewind, increase K to make the slice cap decision more conservative; otherwise, increase success_slice_count by 1. amp is set to 2 in simulation |
| Step 2:<br>If (success_slice_count > Th_count) {<br>  K = K >> 1;<br>  If (K < K_min) K = K_min;<br>  Success_slice_count = 0;<br>} | If the number of consecutive slices in which correct prediction of a new slice is larger than a pre-defined threshold, decrease K by half; and set success_slice_count back to 0. Th_count and K_min are set to 8 and 4 in simulation, respectively. Repeat step 1 and 2 until whole frame is encoded; and repeat step 0, 1, 2 for whole sequence. |

The use of the scaling factor K was evaluated with forty-one high definition representative video sequences in an H.264 Baseline encoder with a bit rate of 4 Mbit/sec. The average results of the simulations over the forty-one video sequences are shown in Table 6. The macroblock size estimation was performed as per Eq. 9 and the size estimation parameters a and b were updated at the macroblock row level as per the example fixed point pseudo code of Table 2. The simulation used the same rate model for both intra and inter macroblocks. Using the same rate model for both intra and inter macroblocks simplifies the implementation at the cost of recued accuracy in the estimated encoded size. The pipeline delay, i.e., the number of encoding stages from the mode decision to the entropy coding, was assumed to be 8. In Table 6, ECD indicates the data collected without the early slice cap decision. In the simulations, amp, Th_count, and K_min were set to 2, 8, and 4, respectively. The value of K_init was set to 256, 144, and 64 for different simulation runs.

As shown in Table 6, the early slice cap decision method effectively capped the peak number of slice rewinds to less than ten per frame. Also, if K_init is smaller, the likelihood of starting a new slice is lower, fewer slices are created, and a larger number of slice rewinds is incurred and vice versa. Thus, trade-offs can made between an increased number of slices and the rewind rate by setting scaling factor K to different values.

TABLE 6

| Settings | Average number of slice rewind per frame | Peak number of slice rewind per frame | Average number of slice increase (%) | Average wasted bit-rate against ECD (%) | Average slice rewind rate against ECD (%) |
|---|---|---|---|---|---|
| Fixed point slice cap implementation without peak case handling | | | | | |
| K_init = 256 | 0.2932 | 33 | 5.373583 | 3.1026343 | 1.953609 |
| K_init = 144 | 0.5864 | 38 | 4.357917 | 2.4051727 | 4.197951 |
| K_init = 64 | 1.2443 | 64 | 3.307334 | 1.6959296 | 9.530332 |

TABLE 6-continued

| Settings | Average number of slice rewind per frame | Peak number of slice rewind per frame | Average number of slice increase (%) | Average wasted bit-rate against ECD (%) | Average slice rewind rate against ECD (%) |
|---|---|---|---|---|---|
| Fixed point slice cap implementation with peak case handling | | | | | |
| K_init = 256 | 0.2272 | 8 | 6.298877 | 3.5500242 | 1.703846 |
| K_init = 144 | 0.4246 | 9 | 5.074737 | 2.8051664 | 3.24448 |
| K_init = 64 | 0.8463 | 8 | 4.295272 | 2.2274645 | 6.920587 |

Table 7 shows pseudo code for another fixed point implementation for computing the size estimation parameters a and b based on previous observations, i.e., as per Eq. 20. In this pseudo code, $$\text{sum\_x} = \sum_{k=0}^{M-1} qRdCost[k+N]$$

$$\text{sum\_x} = \sum_{k=0}^{M-1} qRdCost[k+N]$$

$$\text{sum\_xx} = \sum_{k=0}^{M-1} qRdCost[k+N]^2$$

$$\text{sum\_xy} = \sum_{k=0}^{M-1} qRdCost[k+N] * actBits[k]$$

where qRdCost is computed as per Eq. 19 and actBits is the number of actually consumed bits. Note that these sums are similar to those of Eqs. 11 and 12. The above summations are accumulated after each macroblock is entropy coded. The computation of $\alpha$, $\beta$, $\tau$, a, and b as per Table 7 may be performed after a group of macroblocks M is entropy coded, e.g., at the macroblock row level.

TABLE 7

```
α = M * sum_xy - sum_x * sum_y;
β = sum_xx * sum_y - sum_x * sum_xy;
τ = M * sum_xx - sum_x * sum_x;
shift = MSB_location(τ) - 6;
α = α >> shift; β = β >> shift;
τ = τ >> shift; abs_τ = abs(τ);
if (τ! = 0){
    a = (α * t_tab[abs_τ]) >> 4;
    b = (β * t_tab[abs_τ]) >> 12;
    if (τ < 0) {a = -a; b = -b;}}
else {a = 205; b = 0}
```

For the example of Table 7, the look up table t_tab is defined as:

t_tab[64] =

{4096, 4096, 2048, 1365, 1024, 819, 682, 585, 512, 455, 409, 372, 341, 315, 292, 273, 256, 240, 227, 215, 204, 195, 186, 178, 170, 163, 157, 151, 146, 141, 136, 132, 128, 124, 120, 117, 113, 110, 107, 105, 102, 99, 97, 95, 93, 91, 89, 87, 85, 83, 81, 80, 78, 77, 75, 74, 73, 71, 70, 69, 68, 67, 66, 65}.

The estimation error threshold update is performed for every macroblock as per the pseudo code of Table 1. Further, the slice cap decision may be determined as $$rBudget = sliceCap - SliceBitsConsumedSoFar - \sum_{k=\tau}^{N-1} estBits[k] * \frac{N}{N-T}$$

if $((rBudget^2 < \text{Threshold}) \| (rBudget < 0))$ start new slice where estBits is the estimated bits for the macroblock and sliceCap is the maximum slice size and T is the rd_cost delay. Note that this fixed point implementation allows for the inclusion of macroblocks in the video encoding pipeline that have not yet reached the mode decision stage, e.g., macroblocks that are currently in the intra-prediction or motion estimation stages (see FIG. 1). The rd_cost delay T is the number of pipeline stages before the mode decision stage where the rd_cost will be known. The rd_cost of the "delayed" macroblocks is estimated by applying the N/(N−T) scaling factor.

Figure 8:
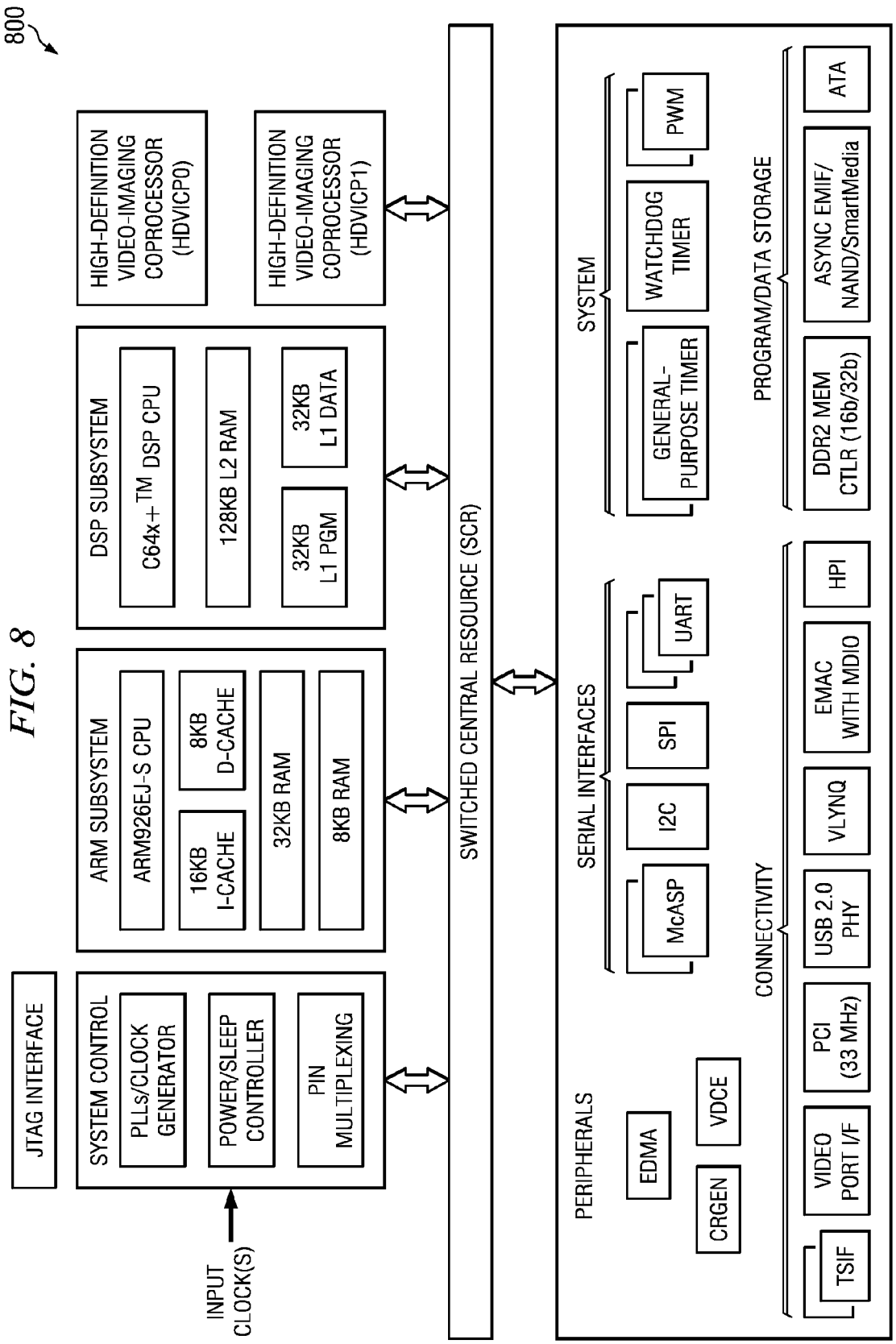
FIG. 8 is a block diagram of an illustrative digital system.

FIG. 8 is a block diagram of an example digital system suitable for use as an embedded system that may be configured to perform an early slice cap decision method as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 800 is a programmable platform designed to meet the processing needs of applications such as video encode/decode/transcode/transrate, video surveillance, video conferencing, set-top box, medical imaging, media server, gaming, digital signage, etc. The SoC 800 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 800 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 800, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 800 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 8, the SoC 800 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. Each HDVICP coprocessor can perform a single 1080 p60 H.264 encode or decode or multiple lower resolution or frame rate encodes/decodes. The HDVICP coprocessors are designed to perform computational operations required for video encoding such as motion estimation, motion compensation, mode decision, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 800 may be configured to perform video encoding in which an early slice cap decision method as describe herein is used. For example, the coding control 340 and slice cap decision 348 of the video encoder of FIG. 3A may be executed on the DSP subsystem or the ARM subsystem and at least some of the computational operations of the block processing 342 may be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

In some embodiments, in the method of FIG. 5, rather than using the rd_cost to estimate the size of an encoded macroblock, other available information for the predicted macroblock such as the sum-of-absolute-differences (SAD), the sum-of-absolute-transformed-differences (SATD), or variance of the residual signal may be used.

In some embodiments, rather than adapting the macroblock size estimation parameters a and b of the method of FIG. 5, the values of these parameters may be predetermined by content dependent training with linear regression.

In some embodiments, rather than adapting a and b for each macroblock, the parameters may be adapted periodically, e.g., every N macroblocks.

In some embodiments, rather than adapting a and b for each macroblock, b may be set to 0 for all macroblocks and a may be adapted periodically, e.g., every N macroblocks, as the sum of the actual encoded sizes of the N macroblocks divided by the sum of the quantized rd_costs of the N macroblocks.

In some embodiments: rather than adapting a and b for each macroblock, b may be set to 0 for all macroblocks and a may be adapted at the picture level as the sum of the actual encoded sizes of the macroblocks of the previous frame divided by the sum of the quantized rd_costs of the macroblocks of the previous frame.

In some embodiments, the slice cap decision may be made at any point in the video encoding pipeline after the required data for making the decision becomes available, i.e., at any point after the prediction mode is determined.

While various embodiments have been described herein in reference to the H.264 and H.241 standards, embodiments for other coding standards will be understood by one of ordinary skill in the art. Such video compression standards include, for example, the Moving Picture Experts Group (MPEG) video compression standards, e.g., MPEG-1, MPEG-2, and MPEG-4, the ITU-T video compressions standards, e.g., H.263, H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), ITU-T/ISO High Efficiency Video Coding (HEVC) standard, etc. Accordingly, embodiments of the invention should not be considered limited to the H.264 video coding standard. Further, the term macroblock as used herein refers to block of image data in a picture used for block-based video encoding. One of ordinary skill in the art will understand that the size and dimensions of a macroblock are defined by the particular video coding standard in use, and that different terminology may be used to refer to such a block.

Embodiments of the early slice cap decision methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method for encoding a video sequence in a video encoding pipeline, the method comprising:
   determining a prediction mode for a macroblock;
   computing an estimated encoded size of the macroblock based on an adaptive macroblock size estimation model and computing the proportional factor $\rho$ as $$\rho = \frac{(\varphi_h - \varphi_l)}{(Rd_H - Rd_L)},$$

wherein $\phi_h$ is an average encoded size of a plurality of macroblocks in the previously encoded frame have a rate distortion value $Rd_H$, $\phi_l$ is an average encoded size of at least one macroblock in the previously encoded frame have a rate distortion value $Rd_L$, $Rd_H$ is a highest rate distortion value in the previously encoded frame such that a number of macroblocks having the rate distortion value $Rd_H$ is larger than a threshold, and $Rd_L$ is lowest rate distortion value in the previously encoded frame such that a number of macroblocks having the rate distortion value $Rd_L$ is larger than the threshold; and
   making a slice cap decision for a current slice based on the estimated encoded macroblock size, wherein the slice cap decision is made prior to entropy coding the macroblock.

2. The method of claim 1, wherein the adaptive macroblock size estimation model is based on a measure of rate distortion of the macroblock, a proportional factor $\rho$ representing accuracy of macroblock size estimations in a previously encoded frame, and an offset factor $\epsilon$ representing accuracy of size estimation for neighboring macroblocks of the macroblock.

3. The method of claim 2, further comprising computing the offset factor $\epsilon$ based on the proportional factor $\rho$, rate distortion values of the neighboring macroblocks, and encoded sizes of the neighboring macroblocks.

4. The method of claim 3, wherein computing the offset factor $\epsilon$ comprises computing $\epsilon=\text{median}(\epsilon_1, \epsilon_2, \epsilon_3)$, wherein $\epsilon_1, \epsilon_2$, and $\epsilon_3$, are offset factors for the neighboring macroblocks computed as $\epsilon_1=\phi'_1-\rho Rd_1, \epsilon_2=\phi'_2-\rho Rd_2, \epsilon_1=\phi'_3-\rho Rd_3$, wherein $\phi'_1, \phi'_3, \phi'_3$ are the encoded sizes of the neighboring macroblocks and $Rd_1, Rd_2, Rd_3$ are the rate distortion values of the neighboring macroblocks.

5. The method of claim 4, wherein the neighboring macroblocks are top, top left, and top right neighboring macroblocks.

6. The method of claim 3, wherein computing an estimated encoded size of the macroblock further comprises computing the estimated encoded size as $\rho Rd+\epsilon$, wherein Rd is the measure of rate distortion and is computed as $SAD/Qs^2$, wherein SAD is a sum of absolute differences computed for the macroblock and Qs is a quantization scale for the macroblock.

7. The method of claim 6, wherein computing an estimated encoded size of the macroblock further comprises computing the estimated encoded size as $(\phi_n+\phi'_{nc})/2$ when $Rd>Rd_H$, wherein $\phi_n=\rho Rd+\epsilon$ and $\phi'_{nc}$ is an encoded size of a co-located macroblock in the previously encoded frame.

8. The method of claim 2, further comprising:
   computing a slice size threshold based on a maximum slice size and an average number of bits used to encode a macroblock in the previously encoded frame.

9. The method of claim 8, wherein making a slice cap decision further comprises:
   estimating a size of the current slice as a sum of actual encoded sizes of previously encoded macroblocks in the current slice and estimated encoded sizes of macroblocks in the video encoding pipeline; and
   comparing the estimated size of the current slice to the slice size threshold.

10. The method of claim 1, wherein the adaptive macroblock size estimation model is based on a rate distortion cost of the macroblock, a quantization step size determined for the macroblock, and size estimation parameters representative of accuracy of encoded size estimations for a plurality of previously encoded macroblocks.

11. The method of claim 10, wherein the plurality of previously encoded macroblocks is one selected from a group consisting of inter-coded macroblocks and intra-coded macroblocks.

12. The method of claim 10, wherein computing an estimated encoded size of the macroblock further comprises computing the estimated encoded size as a* (rd_cost)/qstep)+ b, wherein a and b are the size estimation parameters, rd_cost is the rate distortion cost, and qstep is the quantization step size, and wherein a and b are adapted based on actual encoded sizes and rate distortion costs of the plurality of previously encoded macroblocks.

13. The method of claim 10, wherein the size estimation parameters are adapted for each macroblock.

14. The method of claim 10, wherein the size estimation parameters are adapted after a predetermined number of macroblocks are encoded.

15. The method of claim 10, wherein making a slice cap decision further comprises:
   adapting an estimation error threshold based on a failure rate and estimation error, wherein the estimation error is a difference between actual encoded sizes of the plurality of previously encoded macroblocks and estimated encoded sizes of the plurality of previously encoded macroblocks; and
   making the slice cap decision based on the adapted estimation error threshold, estimated encoded sizes of macroblocks in the video encoding pipeline, actual encoded sizes of previously encoded macroblocks in the current slice, and a maximum slice size.

16. The method of claim 15, wherein adapting an estimation error threshold comprises calculating the estimation error threshold based on a standard deviation of the estimation error.

17. The method of claim 15, further comprising adapting the failure rate by a scaling factor, wherein the scaling factor is increased when a slice cap decision is incorrect and decreased when a slice cap decision is correct.

18. The method of claim 10, wherein the size estimation parameters are determined using a table.

19. The method of claim 15, wherein making a slice cap decision further comprises making the slice cap decision based on an estimated rate distortion cost of at least one macroblock in the video encoding pipeline.

* * * * *